United States Patent [19]
Pollingue

[11] Patent Number: 5,839,952
[45] Date of Patent: Nov. 24, 1998

[54] METHOD AND DEVICE FOR PROCESSING CRUSTACEANS

[76] Inventor: Daniel J. Pollingue, 2119 Monroe St., LaPorte, Ind. 46350

[21] Appl. No.: 694,489

[22] Filed: Aug. 7, 1996

[51] Int. Cl.$^6$ .................................................. A22C 29/02
[52] U.S. Cl. ........................................ 452/8; 452/2; 452/5
[58] Field of Search ............................. 452/1, 2, 5, 7–10

[56] References Cited

U.S. PATENT DOCUMENTS

| | | | |
|---|---|---|---|
| 1,677,579 | 7/1928 | Barry | 452/2 |
| 3,221,362 | 12/1965 | Couret | 452/5 |
| 3,249,962 | 5/1966 | Rossnan | 542/8 |
| 3,257,683 | 6/1966 | Rossnan | 452/8 |
| 4,222,153 | 9/1980 | Schmidt | 452/5 |
| 4,380,094 | 4/1983 | Tolley et al. | 452/1 |
| 4,413,377 | 11/1983 | Betts | 452/5 |
| 4,507,825 | 4/1985 | Betts et al. | 452/2 |
| 4,531,261 | 7/1985 | Sanaka | 452/1 |
| 4,912,810 | 4/1990 | Laughlin et al. | 452/8 |

*Primary Examiner*—Willis Little
*Attorney, Agent, or Firm*—Baker & Daniels

[57] ABSTRACT

An apparatus for extracting tailmeat and other edible materials from crustaceans. The apparatus of the present invention includes a pair of clamps movably mounted to a frame which grasp the head and tail portions of the crustacean and then momentarily impact the head portion towards the tail portion, thus rupturing an internal membrane that bonds the tailmeat to the shell of the crustacean thereby greatly easing the extraction of the tailmeat from the shell. After impact, the clamps are separated from each other so as to separate the head portion of the crustacean from the tail portion. The tail clamp allows the tail portion to flex slightly, which avoids a shearing effect and which retains more edible material in the separated tail portion, where it is subsequently extracted. The tail meat extraction means includes a pair of hollow needles for insertion into the tail portion of the crustacean straddling the intestinal tract, and a charge of compressed air forced through the needles into the tail portion forces the tailmeat out of the shell. A brace on the tail clamp grasps the end of the intestinal tract and retains the intestinal tract within the empty shell. Suction means are included for extracting head fat from the separated head of the crustacean, which head fat is collected and preserved for packaging along with the tailmeat.

26 Claims, 13 Drawing Sheets

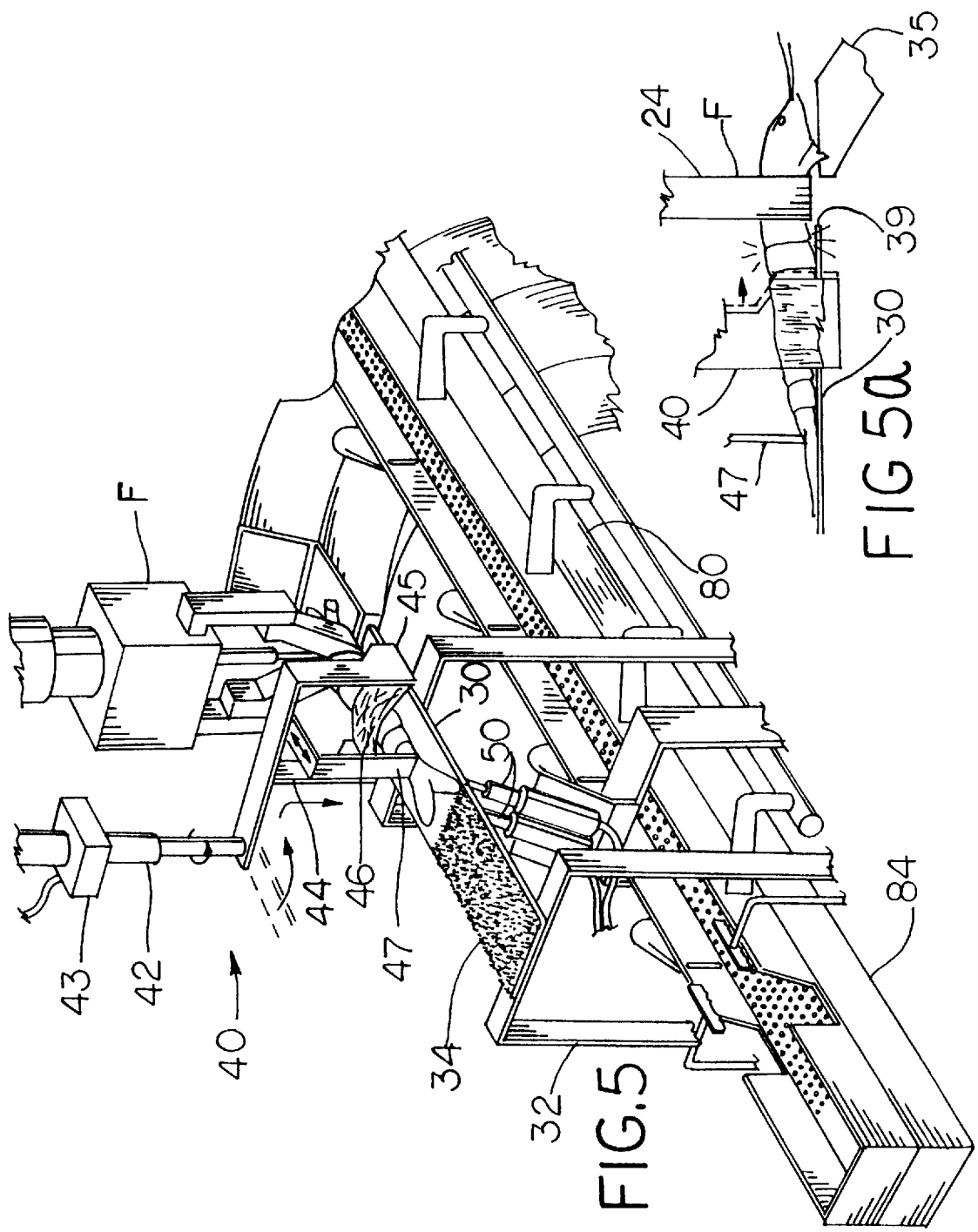

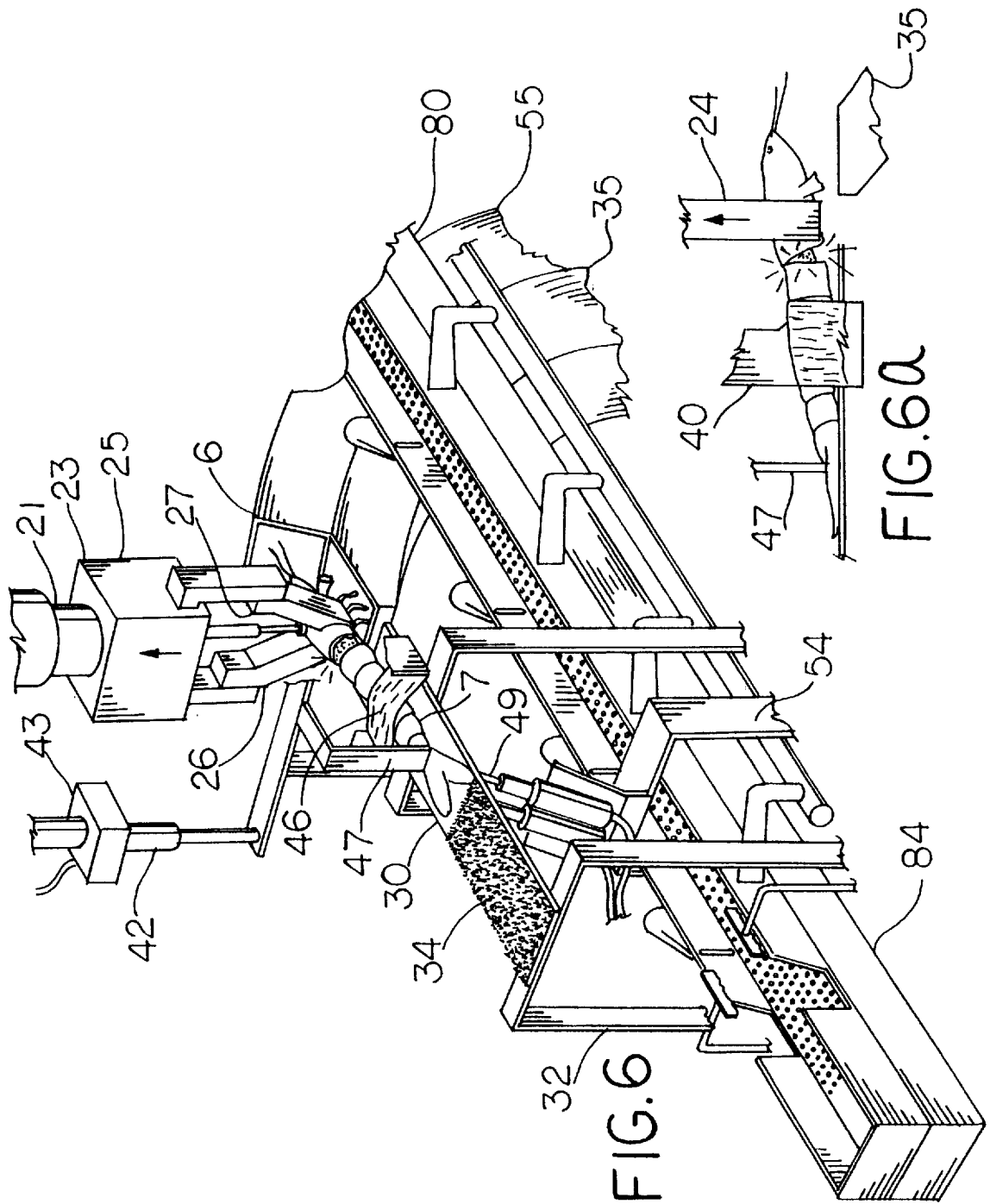

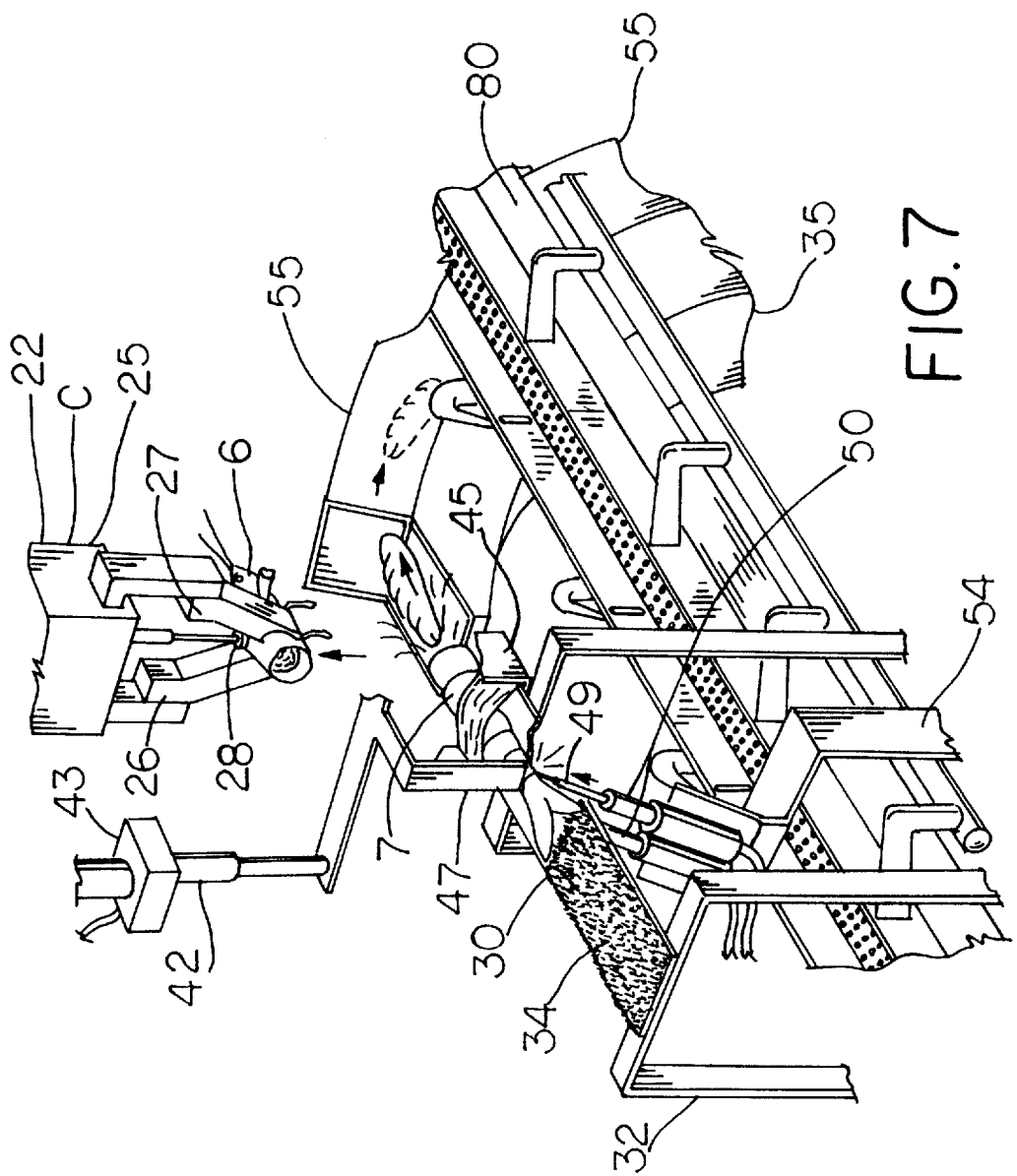

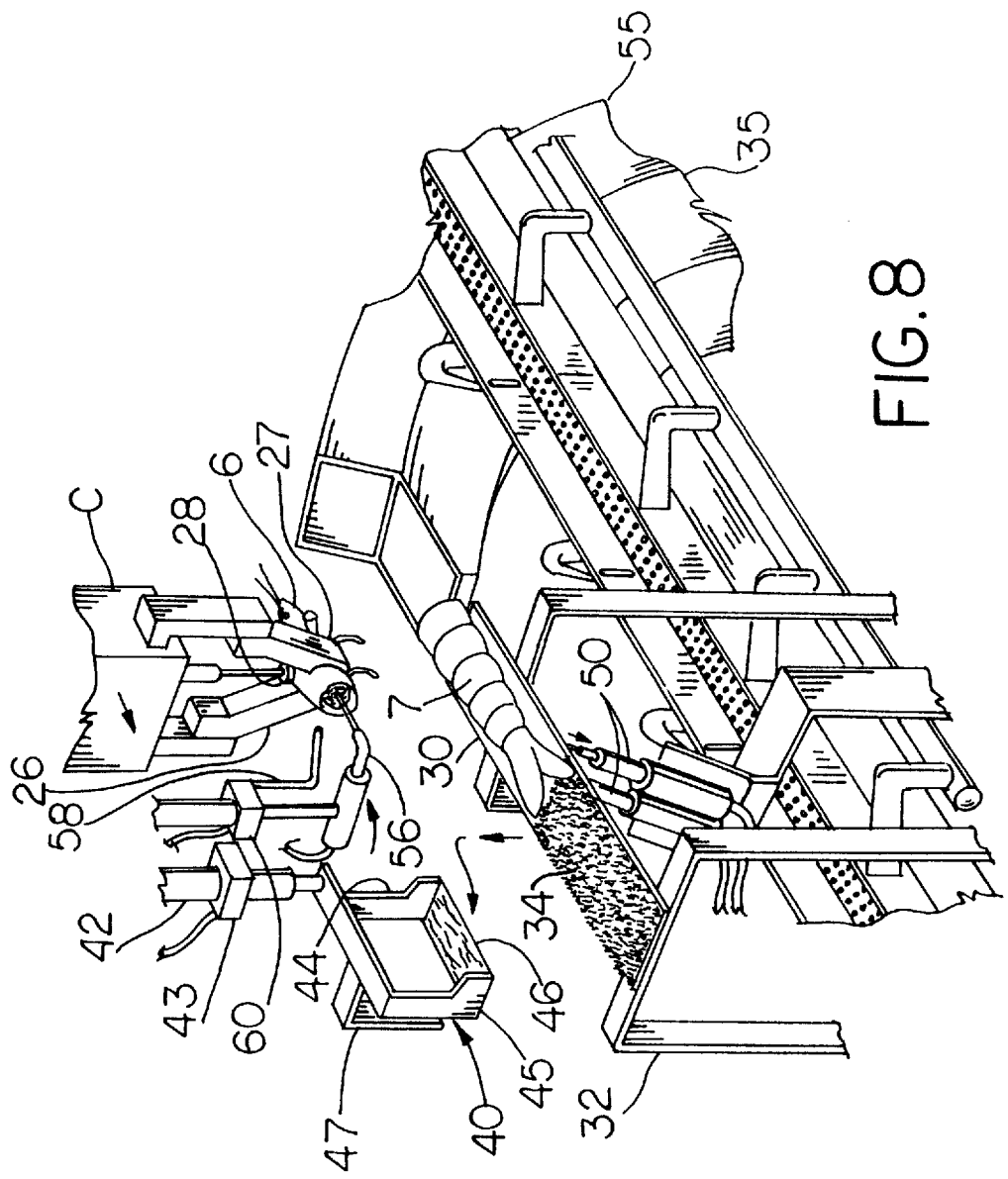

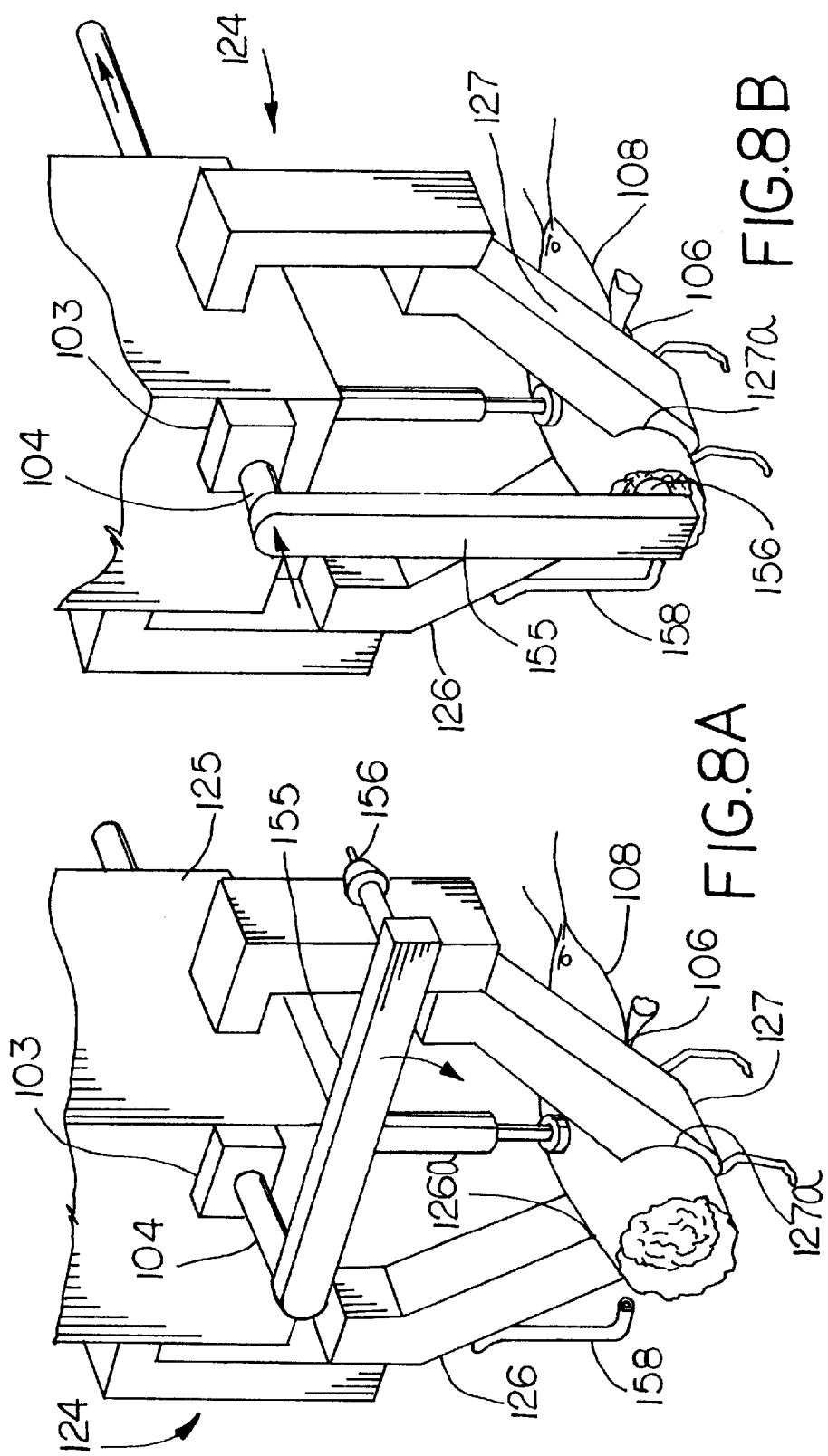

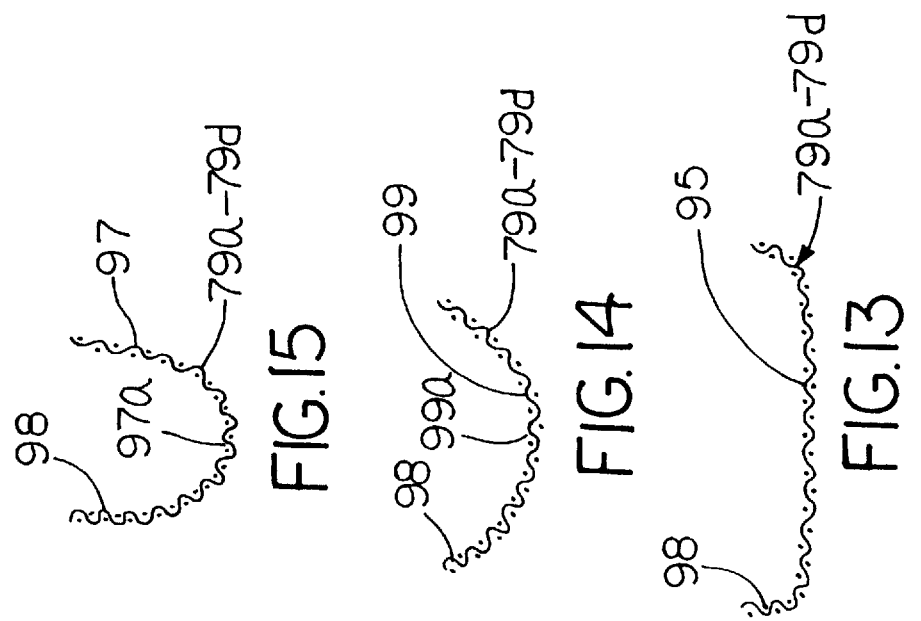
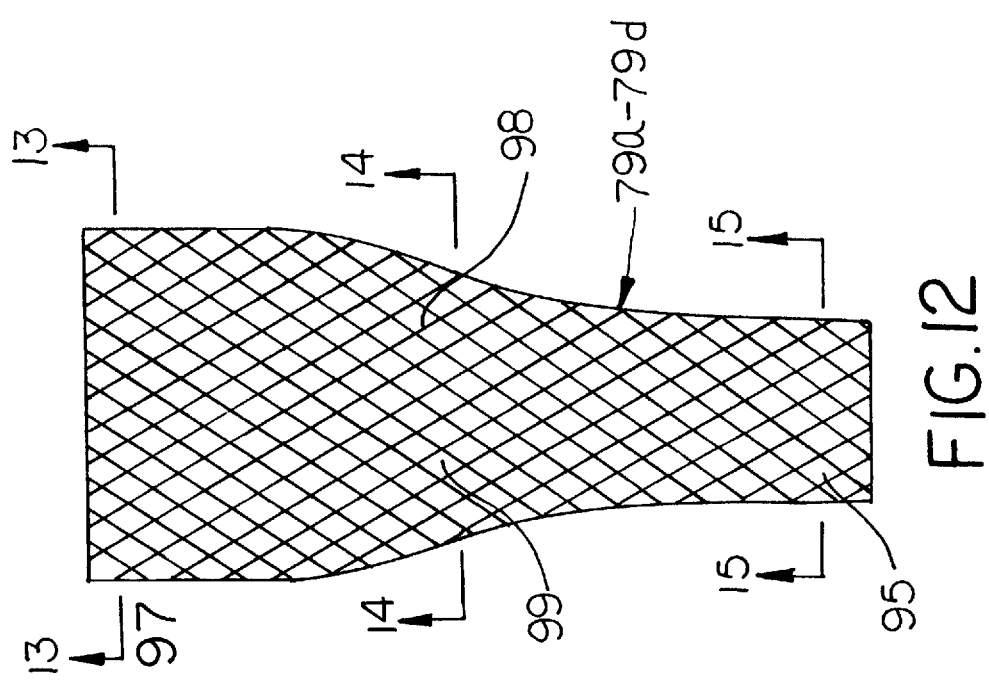

METHOD AND DEVICE FOR PROCESSING CRUSTACEANS

The present invention relates generally to a machine for processing crustaceans such as crawfish and extracting the tailmeat and other edible portions therefrom. The present invention also relates to an automatic air conveyor loading system that delivers the crawfish to the processing machine at a desired orientation and at a predetermined rate.

BACKGROUND OF THE INVENTION

In many cultures the tender tailmeat of crawfish is considered quite a delicacy, and crawfish are an important part of the culinary heritage in many areas. Today, crawfish are an important component of the well known Cajun cuisine, and can be boiled and served whole, or can be peeled for use in more elegant dishes.

Crawfish are quite abundant in low lying swampy areas, such as the bayous of Louisiana's Atchafalaya Basin in the southern United States. For many years crawfish have been trapped in the wild, but more recently rice farmers have begun to raise crawfish in their rice ponds when rice is not being grown. In many regions, a short time after the rice is harvested, the fields are again flooded and the crawfish emerge in quantity and proceed to spawn. The immature crawfish find shelter in the rice plants, and feed off old decaying rice plants, bacteria, and fungi, making crawfish an ideal rotation crop.

In many localized regions, consumers prefer whole, live crawfish. However, in order to be widely commercialized, the crawfish must be peeled and the tailmeat must be extracted. Hand peeling contributes to bacterial contamination, and accordingly the peeling process must conform to governmental regulations. The rice growing belt of the southern United States is capable of producing great quantities of crawfish, and the state of Louisiana alone produces over 100 million pounds of whole crawfish annually. However, due to the lack of a viable mechanical peeling machine, most of the market is confined to localized regions, remote gourmet restaurants, and some overseas markets. Thus, in order for crawfish producers to capture a larger market segment, both in the United States and abroad, the crawfish must be mechanically peeled and the tailmeat extracted.

Although other crustacean processing devices have been proposed, for example U.S. Pat. No. 4,785,502 issued to Howard, U.S. Pat. No. 4,912,810 issued to Laughlin, and U.S. Pat. No. 5,055,085 issued to Thibodeaux, those devices have not found widespread acceptance, and therefore currently the peeling process is primarily manual. Further, most common peeling practices totally ignore the salvage of the "head fat" (actually the hepatopancreas organ) which gives crawfish its distinctive flavor. Accordingly, only those consumers who eat the whole boiled crawfish or those diners who eat carefully peeled crawfish at gourmet restaurants are able to enjoy the full distinct crawfish flavor. Another drawback of hand peeling is that the process is very inefficient and highly labor intensive, coupled with the fact that peeling is a low paying job which makes for an unreliable workforce. In order to process a full supply of cooked crawfish, a producer may require 36 workers, 10 hours per day, six days per week. The work is very tedious and labor intensive, and generally very inefficient, and also forces the crawfish producer to rely on a somewhat unreliable labor market. Frequently, if large portion of the work force fails to show up for work, a large quantity of crawfish waiting to be processed spoils, which obviously increases the producer's costs.

In addition to facing the high cost of hand processing, the domestic crawfish industry also faces commercial competition from both the shrimp industry and from foreign crawfish imports. The majority of imported crawfish come from China and other Asian countries, and the extremely low labor costs in that region make it extremely difficult for domestic producers to compete. However, it is expected that governmental regulations will soon prevent the import of foreign crawfish for lack of compliance with the rules discussed above, which will place an even greater premium on domestically produced crawfish. Domestic producers also have a hard time competing with the shrimp industry, because the shrimp industry has developed large scale mechanical peeling machines that significantly lower the per pound price of processed shrimp meat.

The market for processed crawfish, and thus the very livelihood of crawfish producers, is now in jeopardy. The domestic crawfish industry presently cannot compete with the low labor costs of the imported crawfish or with the low price of mechanically processed shrimp. Furthermore, the crawfish industry has been unable to develop a viable, efficient mechanical peeling machine. Although some have tried to adapt shrimp processing machines to process crawfish, these efforts have failed because the tailmeat on crawfish is much harder to extract due to a tough internal membrane that tends to bind crawfish tailmeat to the internal surface of their shells. Shrimp processing machines either fail to extract enough of the tailmeat to be economical, or they simply waste or destroy most of the edible portion.

There have been prior attempts to develop crawfish processing machines, but most prior art mechanical machines were woefully inefficient. Like the shrimp machines, the prior art crawfish machines simply wasted too much of the precious tailmeat to be economical, or they completely failed to recover the head fat, and thus the distinctive crawfish flavor was lost. Most of the prior art machines simply lopped off the entire tail by shearing the crawfish at the joint between the head and the tail. Thus a portion of the edible meat that extends forward of the tail into the head, which can represent a sizeable percentage of the tailmeat, was lost. Also, none of the prior art machines had any mechanism at all to extract the head fat, which made the processed meat much less competitive in marketplace because of the loss of the distinctive flavor. Finally, none of the prior art machines could reliably and effectively extract the "mud vein" from the tailmeat.

Another serious drawback with even the best of the prior art processing machines is the lack of an automatic loading feature. Without an automatic loading feature, crawfish have to be hand loaded, one by one, into the processing machine. Again, the costs associated with this additional labor component undermines the competitiveness of the processed meat.

Accordingly, there exists a need for an improved crustacean processing machine that quickly and efficiently extracts a very high percentage of the edible meat from crawfish. There also exists a need for an improved crawfish processing machine that extracts and preserves the "head fat" that gives crawfish its distinctive flavor. Such an improved crawfish processing machine must separate the tailmeat from the shell without shearing the crawfish or without simply cutting off the tail, and must be able to process enough crawfish to enable domestic crawfish producers to compete with both the shrimp industry and the imported crawfish industry. Such an improved machine must also be able to extract the tailmeat without severing the mud vein, and should include an automatic loading feature.

SUMMARY OF THE INVENTION

The improved crawfish processing machine of the present invention helps crawfish producers to address each of the problems outlined above. An improved crawfish processing machine according to the present invention enables crawfish producers to process crawfish reliably, quickly and economically. The present invention extracts a much higher percentage of the tailmeat than prior art devices, and preserves the distinctive crawfish flavor by recovering a sizeable percentage of the "head fat." The present invention utilizes a novel impact or "bumping" feature that ruptures the membrane that binds the tailmeat to the shell, and also utilizes a novel separation feature that rips or tears the tail away from the body rather than shearing the crawfish apart. Accordingly, a larger portion of the tailmeat is extracted. Furthermore, the present invention includes a novel "head fat" extraction method, which extracts and preserves the head fat for packaging along with the processed tailmeat, thus preserving the distinctive crawfish flavor and enhancing the marketability of the finished product.

The improved crawfish processing machine of the present invention incorporates an automatic air conveyor loading system that delivers commercial size crawfish to the machine in a desired orientation. The air conveyor system includes a unique orientation chute or slide that delivers the crawfish onto the conveyor in a dorsal side up, tail first orientation. The air flotation conveyor then slowly floats the crawfish towards the pick up point in the machine where the actual processing commences. The air flotation system includes an automatic, air operated centering system that keeps the crawfish in the middle of the conveyor at all times, which ensures the best possible loading position and ensures removal of the mud vein as is discussed below.

The present invention includes an upper processing assembly which includes a head clamp for grasping the head of the crawfish, and also includes a lower processing assembly that includes a tail clamp for grasping the tail of the crawfish. The head clamp is mounted on a reciprocating carriage assembly that allows the head clamp to reciprocate horizontally. The entire carriage is connected to a mechanical counterbalance, which ensures smooth, vibration free operation at all times. A vertically oriented 4 position linear thruster, which has the head clamp assembly mounted thereto, is attached to the carriage of the upper processing assembly. The head clamp itself includes a pair of horizontally opposed gripper arms which clamp onto the crawfish and which are actuated by a horizontal pneumatic cylinder. The head clamp assembly also includes a vacuum cup to assist in the pick up of the crawfish, and a rotary unit to operate the head fat extraction cup as discussed below. Accordingly, the upper processing assembly is capable of grasping the crawfish at the pick up point and transporting the crawfish vertically and horizontally through the machine.

The lower processing assembly includes a main processing station or plate which is mounted to a slide or carriage. The lower processing assembly is driven by a short action linear thruster which allows the lower processing assembly to reciprocate horizontally in order to effectuate the innovative impact or "bumping" technique referred to above, which eases the extraction of the tailmeat from the shell. A flexible tail clamp mounted to a rotary unit is attached to the end of a second linear thruster, which enables the tail clamp to rotate from a retracted position to an extended position over the tail portion of the crawfish. A linear thruster then lowers the clamp onto the tail of the crawfish and clamps the tail firmly against the processing plate. The tail clamp includes an extension that presses against the end of the tail at the terminus of the intestinal tract or "mud vein." A pair of air extraction needles are positioned below the main processing plate, and a third linear thruster drives the needles into the tail of the crawfish to extract the tailmeat at the appropriate moment.

The present invention utilizes an air operated automatic infeed conveyor to sort, orient, and deliver the crawfish to the pick up point. An infeed hopper utilizes vibrating cascade bars to separate the crawfish, which tend to clump together. The hopper empties onto a reciprocating conveyor, which in turn empties the crawfish into a series of collection chutes, each of which empties into a vibrating orientation slide. The orientation slides are lined with artificial grass or similar material, and are shaped to gradually narrow into a trough like shape. The legs and claws of the crawfish catch on the textured artificial grass, so that each crawfish exits the orientation slide in a tail first, dorsal side up orientation. The oriented crawfish are routed onto an air conveyor, consisting of a pressurized air plenum having a perforated surface, which floats the crawfish on a bed of air. Horizontal air jets on each side of the plenum urge the crawfish forward and maintain the crawfish in the center of the air flotation conveyor. Preferably, the conveyor is divided into two segments, each having a desired forward velocity, in order to prevent the crawfish from piling on top of each other.

A cooked and chilled crawfish is delivered to the machine in a desired orientation, preferably upright and with the tail portion folded or curved forward towards the head, either by hand or by the automated conveyor discussed in greater detail below. The head clamp, augmented by the vacuum cup, picks up the crawfish at the delivery point by gripping the back of the crawfish. After clamping onto the crawfish at the pickup station, the head clamp raises the crawfish past the claw choppers, which tear off the claws, and then transports the crawfish horizontally across the main processing plate. In so doing, the tail of the crawfish is dragged across a tail straightening brush that wipes back or straightens the tail so that the ensuing functions can be carried out. The head clamp drops slightly relative to the processing plate, which helps to flatten the tail against the processing plate. The tail clamp then rotates and descends onto the tail of the crawfish, firmly clamping the tail against the processing plate, but in a flexible or resilient fashion that allows the forward portion of the tail structure to flex slightly in a vertical direction within the tail clamp. A resilient diaphragm integrated into the tail clamp allows for this slight amount of vertical flexibility, and avoids a shearing effect at the separation point as will be discussed below. With the head clamp holding the head of the crawfish, and with the tail clamp holding the tail, the lower processing assembly, the main processing plate, the tail clamp, and hence the tail of the crawfish is momentarily impacted or "bumped" toward the stationary head clamp holding the head, which ruptures the bond between the tailmeat and the shell, thus making the tailmeat significantly easier to extract. Immediately thereafter, the head clamp ascends which separates the head from the tail. The resilient diaphragm of the tail clamp allows the forward portion of the tail to flex slightly in the vertical direction, so that the resulting separation is by tearing rather than by a straight shearing effect. As a result, a larger portion of the tailmeat, including a portion of the meat that extends into the head, is extracted from the crawfish and packaged.

After separation, the dual air extraction needles positioned below the main processing plate are driven upward by the linear thruster through two holes in the main processing plate and pierce the underside of the tail, one on each side of the mud vein. A charge of compressed air forces the tailmeat out of the shell and into a recovery hopper or conveyor. The dual needle arrangement in conjunction with the tail clamp promote the removal of the mud vein from the tailmeat by retaining the mud vein within the spent shell. The spent shell is released by the tail clamp assembly, which then returns to its original position. The spent shell is then shoved out of the way when another crawfish is moved onto the main processing plate.

Unlike prior art machines, the present invention preserves the head fat for packaging through the use of a novel head fat extraction method. After separation, the head of the crawfish is still held by the head clamp, and the rotary unit attached to the head clamp actuates to swing the head fat extraction cup into position adjacent the head. A linear thruster drives the vacuum cup into the head, and the vacuum cup sucks out and collects the head fat as the upper processing assembly and the head clamp are returning to their initial starting positions to commence another cycle.

For the sake of simplicity, the foregoing description describes the operation of a single processing head and its associated component parts. In a preferred embodiment, the present invention will typically include four pairs of processing heads totalling eight processing heads. Each pair of processing heads will share a single linear thruster for the head clamp assembly as well as a single linear thruster for bumping the lower processing assembly. A single processing head machine according to the present invention can process crustaceans at a projected rate of 17 crustaceans per processing unit per minute, which is over 1000 crustaceans per hour. A machine incorporating 8 processing units can process crustaceans at a projected rate of approximately 8000 crustaceans per hour, which is roughly equivalent to the output of 32 hand peelers.

The control of the machine is governed by an electronic programmable controller. The controller ensures that each step in the process is carried out in the proper sequence, and the controller can be adjusted to vary the cycle time per crawfish. The controller monitors the input and output of each processing head, and enables any two heads to be shut off for maintenance, etc., while the other units remain in operation. Vacuum operated counters responsive to the vacuum pick up cups track the crawfish infeed and alert the operator to a malfunction. These counters serve to both track the number of crawfish processed, such as for accounting purposes, and also to alert the operator to a potential malfunction if the machine fails to pick up the crawfish. Also, the present invention includes an infrared sensor at the pick up point, which when interrupted by a crawfish initiates the processing cycle.

Accordingly, it is an object of this invention to provide an economical and efficient machine for processing crustaceans, especially crawfish.

It is another object of this invention to provide a crawfish processing machine that interrupts the normal bond between the edible tailmeat of the crustacean and the shell in order to facilitate easier removal of the tailmeat from the shell.

A still further object of this invention is to provide a crawfish processing machine that recovers a higher percentage of the edible meat by tearing the tail away from the body rather than by shearing the tail off the body.

Yet another object of this invention is to provide a crawfish processing machine that recovers the head fat, thus preserving the distinctive crawfish flavor.

A still further object of this invention is to provide a processing machine that can be loaded automatically rather than by hand.

These and other objects of the invention will become evident to those skilled in the art upon a reading of the following description.

BRIEF DESCRIPTION OF THE DRAWINGS

FIG. 5 is a fragmentary view in perspective similar to those shown in FIGS. 2 through 4, but showing the tail clamp of the lower processing assembly grasping the straightened tail of the crustacean;

FIG. 5a is a fragmentary elevational view showing the head clamp and the tail clamp grasping the head and tail respectively of the crustacean, and further showing the tail clamp and the lower processing assembly being impacted or bumped towards the head clamp to rupture the internal membrane securing the tailmeat to the shell;

FIG. 6 is a fragmentary view in perspective showing the head clamp and the upper processing assembly being drawn upwardly relative to the lower processing assembly in order to separate the crustacean's head from the tail; FIG. 6a is a fragmentary elevational view showing the head portion being separated or torn away from the tail portion;

FIG. 7 is a fragmentary view in perspective showing the dual air injection needles being moved upwardly through the processing plate and injecting air into the tail, thereby extracting the tailmeat;

FIG. 8 is a fragmentary view in perspective of the head fat extraction mechanism shown extracting the head fat as the head clamp returns to its original position;

FIG. 8A is a fragmentary view in perspective of an alternate embodiment for the head fat extraction mechanism shown in FIG. 8, shown with the head fat extraction cup in a retracted position;

FIG. 8B is a fragmentary view in perspective of the head fat extraction mechanism shown in FIG. 8A, shown with the vacuum cup in the lowered position and inserted into the head of the crustacean;

FIG. 12 is a front elevational view of one of the orientation chutes shown in FIG. 11;

FIG. 13 is a cross sectional view of the orientation chute taken along lines 13—13 of FIG. 12;

FIG. 14 is a cross sectional view of the orientation chute taken along lines 14—14 of FIG. 12; and FIG. 15 is a cross sectional view of the orientation chute taken along lines 15—15 of FIG. 12.

DETAILED DESCRIPTION OF THE INVENTION

Figure 1:
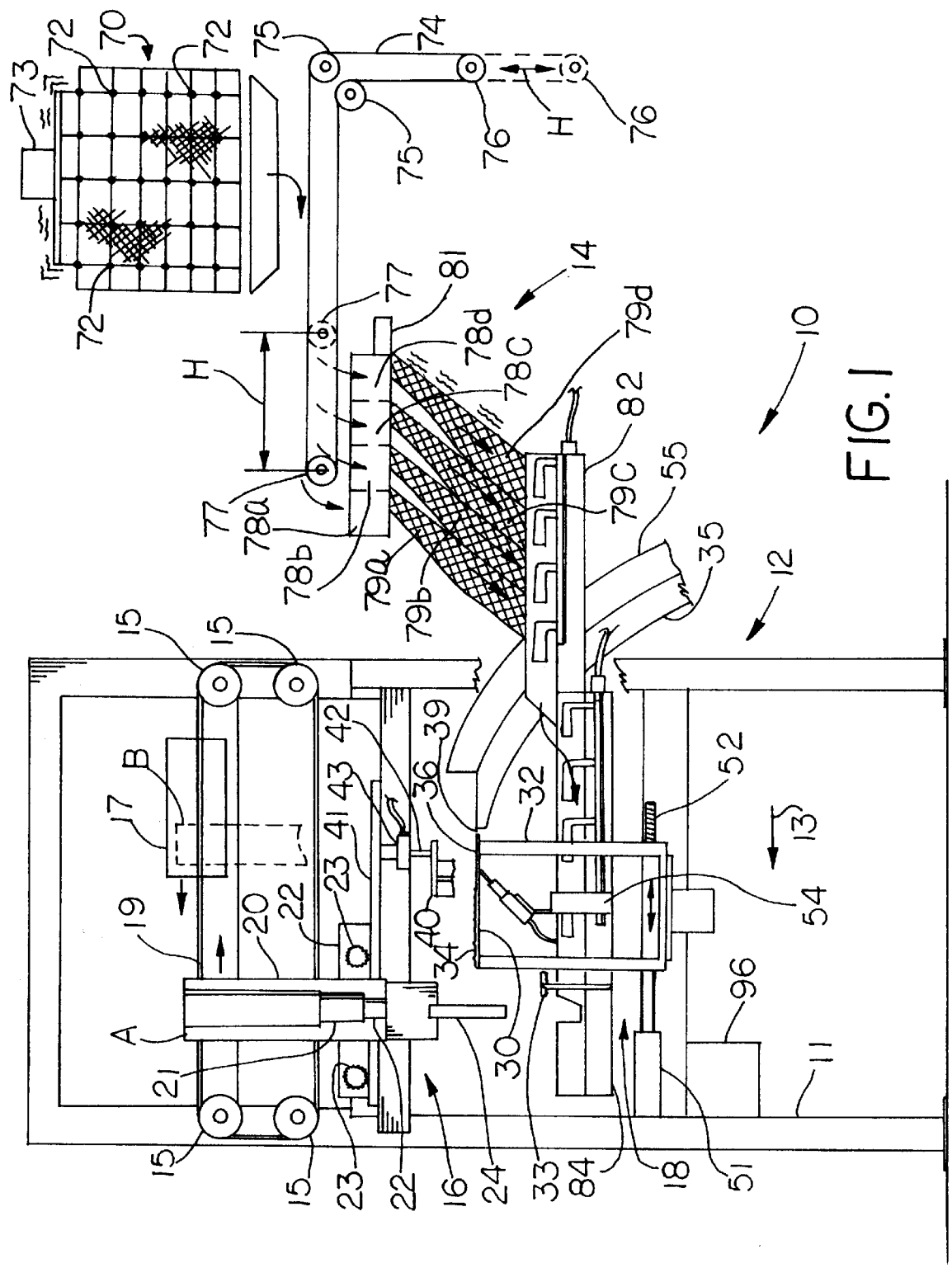
FIG. 1 is an elevational view of the crustacean processing machine of the present invention including an elevational view of the automatic loading system.

The embodiment described herein is not intended to limit the scope of the invention to the precise form disclosed. Rather, the embodiment has been chosen and described to explain the principles of the invention and its application and practical use to best enable others skilled in the art to follow its teachings. Although a typical commercial embodiment would incorporate four pairs of processing heads for a total of eight processing heads per machine, for the sake of simplicity, the structure and operation of a single processing unit will be described.

Referring now to the drawings, a crawfish processing machine according to the present invention is generally indicated by the reference numeral 10. Machine 10 includes main processing assembly 12 and automatic loading system 14, which delivers cooked and chilled commercial size crawfish 8 to main processing assembly 12 in a dorsal side up, tail first orientation as is discussed in greater detail below. Automatic loading system 14 delivers crawfish 8 in an infeed direction as indicated by the reference arrow 13. Main processing assembly 12 includes upper processing assembly 16 and lower processing assembly 18, both of which are mounted to frame 11 as is discussed in greater detail below. Each crawfish 8 includes a head portion 6 and a tail portion 7.

Upper processing assembly 16 includes carriage 20. Carriage 20 includes reciprocating drive assembly 22 equipped with one or more pinions 23 that engage rack 41, so that carriage 20 can reciprocate back and forth relative to frame 11 from a first position A as shown in FIG. I to a second position B as shown in dotted lines in FIG. 1, in a direction substantially parallel to the infeed direction 13 of crawfish 8. Preferably, carriage 20 has a horizontal travel of several inches and an adjustable cycle time. Upper processing assembly 16 includes counterweight 17, which weighs the same as carriage 20 and all of the attachments thereto. Carriage 20 is moveable between an A position in which head clamp 24 is centered over the crawfish pick up point as is discussed below, and a B position (shown in dotted lines in FIG. 1) in which carriage 20 is positioned over the main processing plate as is discussed below. Carriage 20 is preferably a device marketed under the brand name Ultran by Bimba Manufacturing. Linkage belt 19 mounted on a plurality of pulleys 15 connects carriage 20 to counterweight 17, so that as carriage 20 moves back and forth between positions A and B, counterweight moves in the opposite direction, which equalizes and balances the inertial forces created when carriage 20 starts and stops its horizontal stroke and which ensures smooth, vibration free operation. Attached to carriage 20 is linear actuator or thruster 21, which includes moveable end 23. Linear thruster 21 is vertically oriented so that it has a substantially vertical stroke. Linear thruster 21 is preferably a four position, air operated device as is commonly employed in the machine industry and marketed by Bimba Manufacturing. Alternatively, a typical pneumatic cylinder as is commonly employed in the machine industry may be used. Movable end 23 of thruster 21 has attached thereto clamp assembly 24. As shown in FIG. 2, clamp assembly 24 includes a pair of gripper arms 26, 27, which are preferably molded or otherwise formed from a stiff rubber material so that clamp assembly 24 can accommodate a variety of crawfish sizes. Gripper arms 26, 27 each include curved surface or indentation 26a, 27a, respectively in order to ensure a firm grip. Gripper arms 26, 27 are mounted to pneumatic gripper 25 which is mounted horizontally at end 23 of thruster 21, so that gripper arms 26, 27 can be shifted horizontally between open position and a closed position clamped around the crawfish upon actuation of gripper 25. Pneumatic gripper 25 is preferably a pneumatically operated Parallel Gripper sold under the brand name PHD by PHD, Inc., of Airport and Piper Drive, Fort Wayne, Ind. Clamp assembly 24 further includes suction cup 28 which is disposed between gripper arms 26, 27 for assisting in the pick up of crawfish 8. Suction cup 28 includes vacuum sensitive counter 29 which is discussed in greater detail below. By virtue of thruster 21, clamp assembly 24 can be moved vertically to four pre-set positions, including the fully retracted position C shown in FIG. 2, the fully extended pickup position D shown in FIG. 3, a first intermediate position E shown in FIG. 4 for travel across the processing plate 30 as discussed below, and a second intermediate position F shown in FIG. 5 for holding the head of the crawfish during the impact or "bumping" step as discussed below. Each of these positions is governed by a Hall effect switch located inside the linear thruster as is common practice in the machine industry, which allow the user to adjust the stroke of the thruster or cylinder as desired. As shown in FIG. 8, head clamp assembly 24 further includes vacuum extraction tube 56 and head ejection air jet 58, both of which are mounted to rotary unit 60, and which are discussed in greater detail below. Rotary unit 60 is preferably a device sold under the trade name Pneu-Turn by Bimba Manufacturing, as are each of the rotary units described herein. Finally, a pair of stationary serrated blades 33 are mounted to frame 11 adjacent the crawfish pick up point, which remove the claws from crawfish 8 as the crawfish is being raised by clamp assembly 24.

Figure 2:
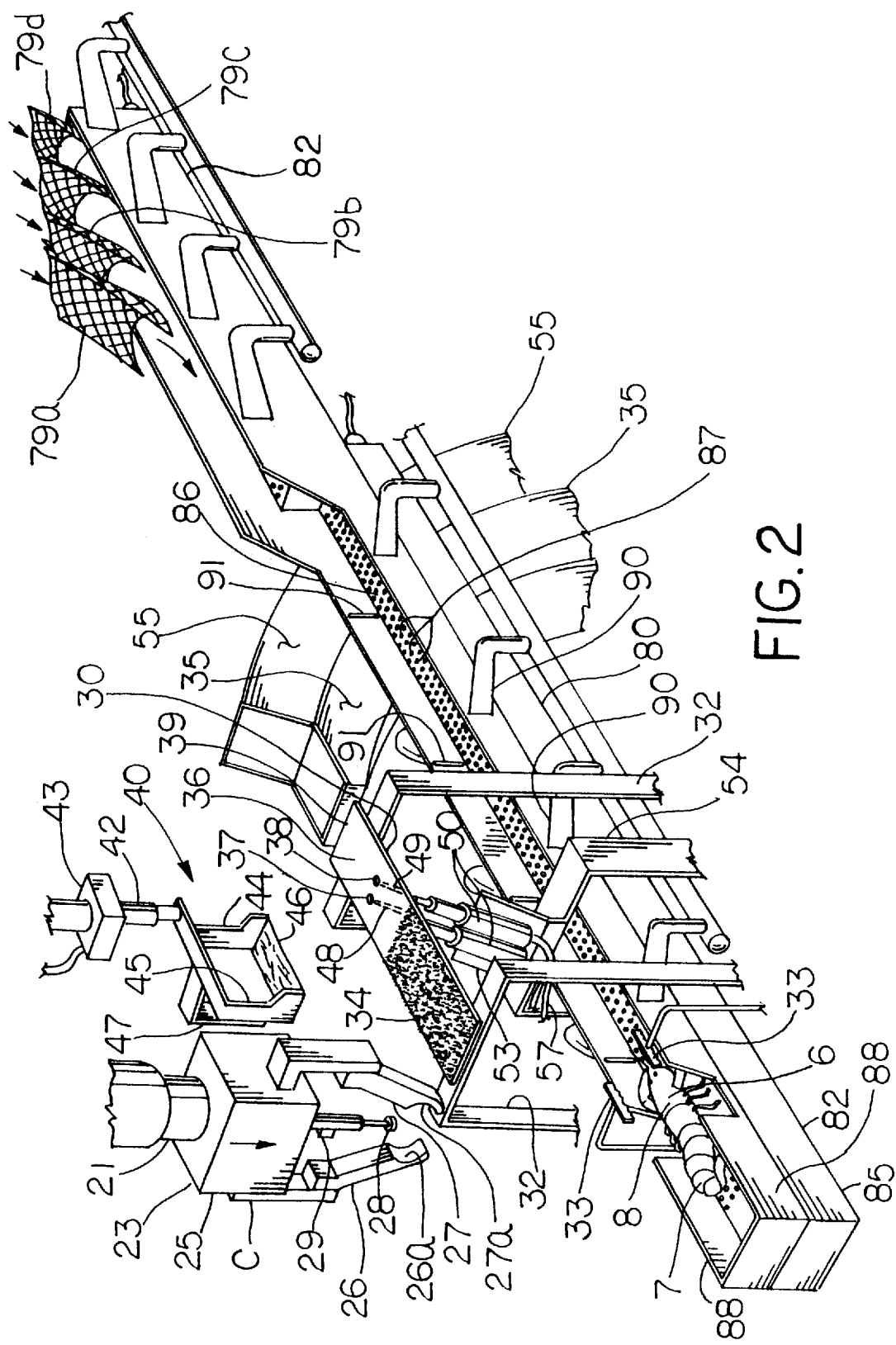
FIG. 2 is a fragmentary view in perspective of the crustacean processing machine of the present invention showing the infeed conveyor and the upper and lower processing assemblies.
Figure 3:
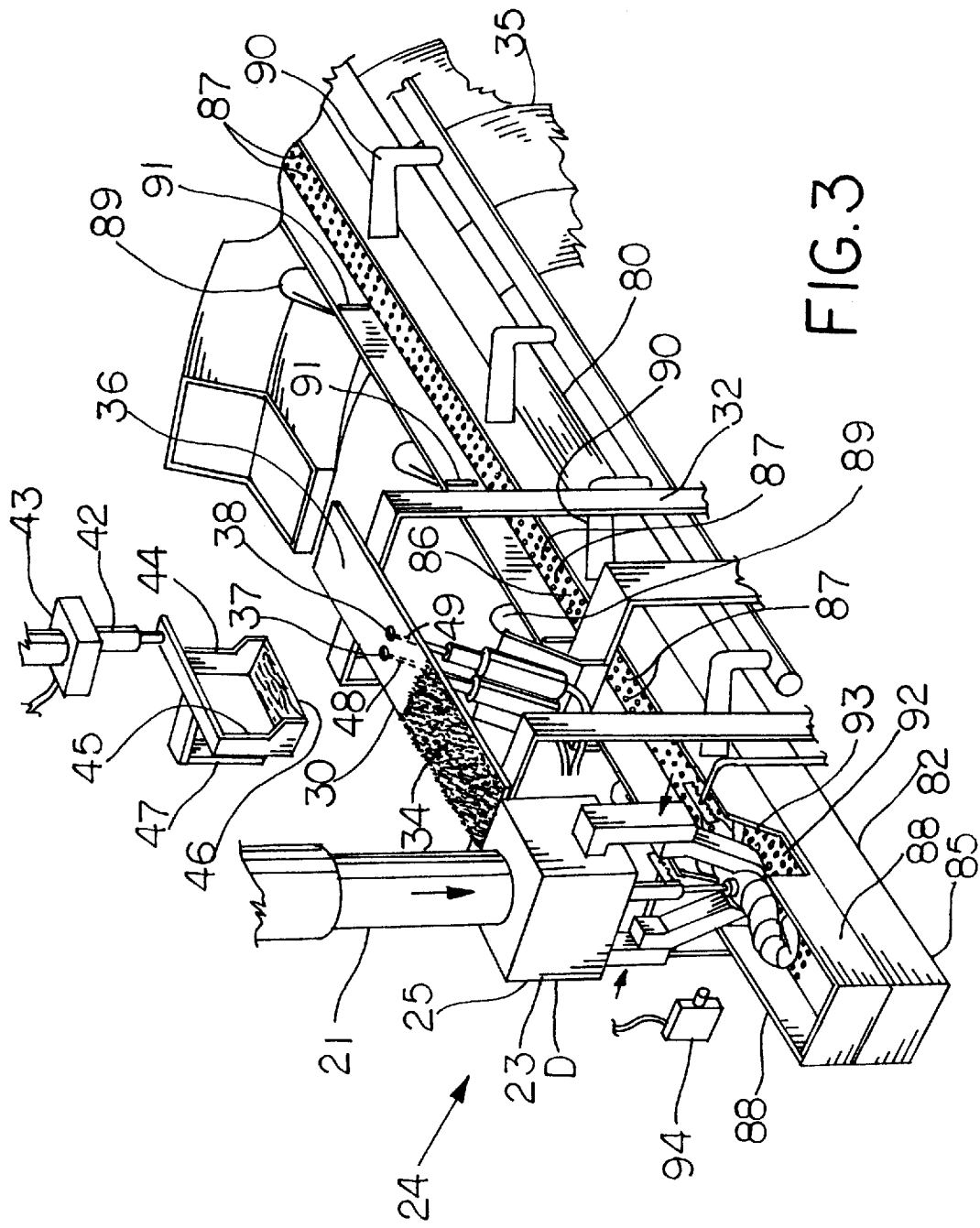
FIG. 3 is a fragmentary view in perspective similar to that shown in FIG. 2, but with the upper processing assembly shown grasping a crawfish.
Figure 4:
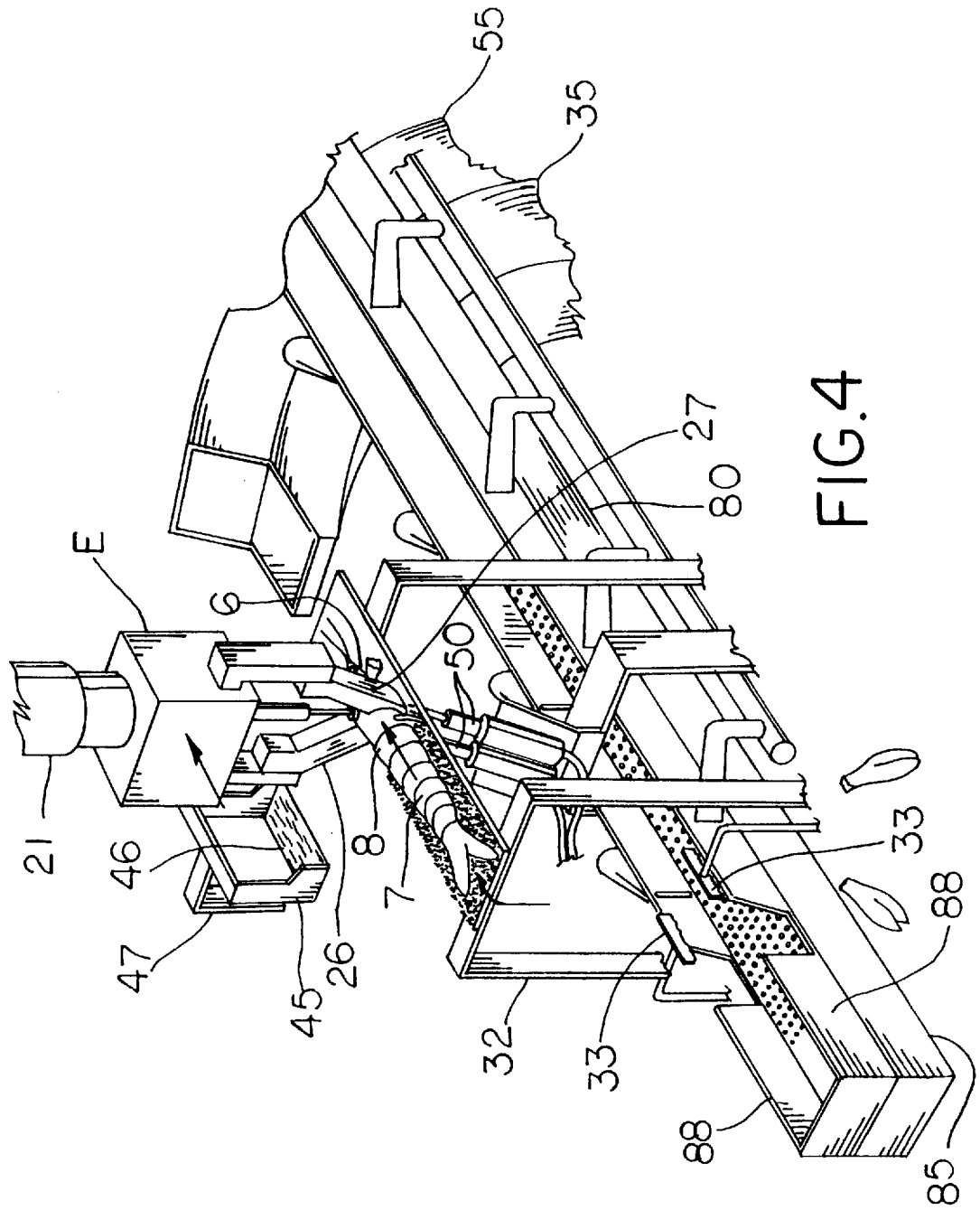
FIG. 4 is a fragmentary view in perspective similar to those shown in FIGS. 2 and 3, but with the upper processing assembly shown dragging the tail of a crustacean across the tail straightening element in preparation for the separation and extraction steps.
Figure 9:
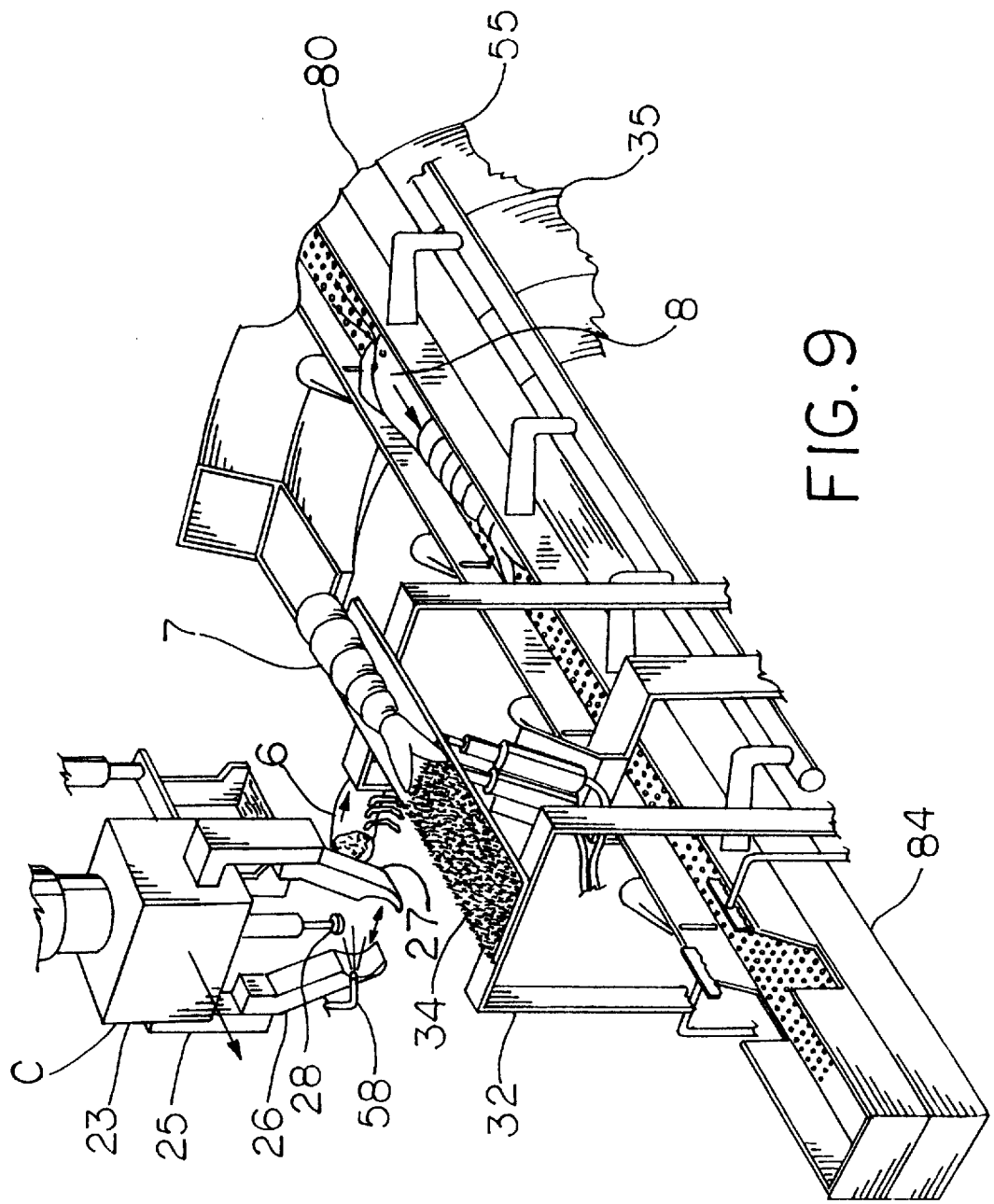
FIG. 9 is a fragmentary view in perspective similar to that shown in FIG. 8 and illustrating the spent head being ejected from the head clamp.
Figure 10:
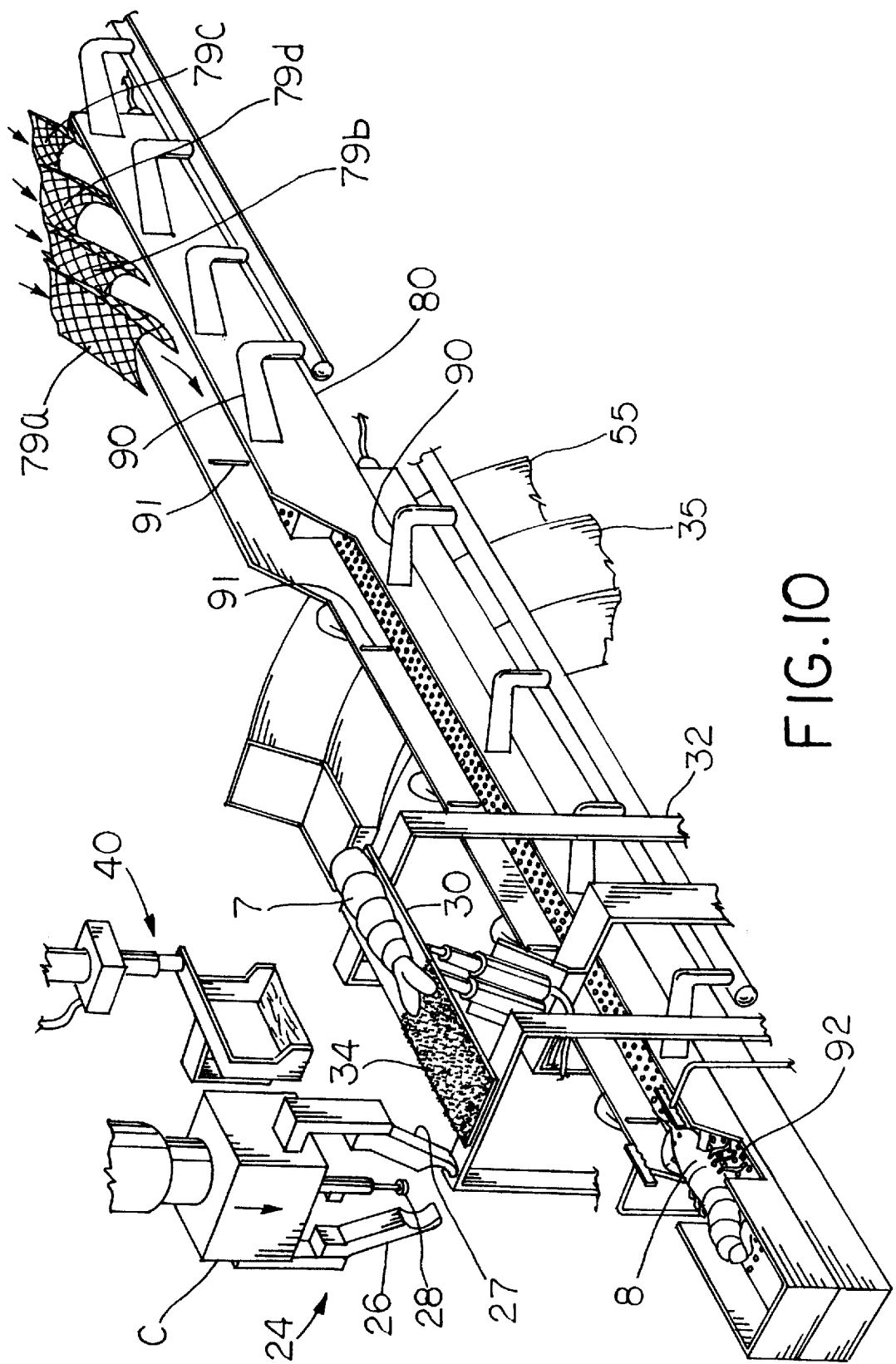
FIG. 10 is a fragmentary view in perspective showing the head clamp preparing to pick up the next crustacean for processing.
Figure 11:
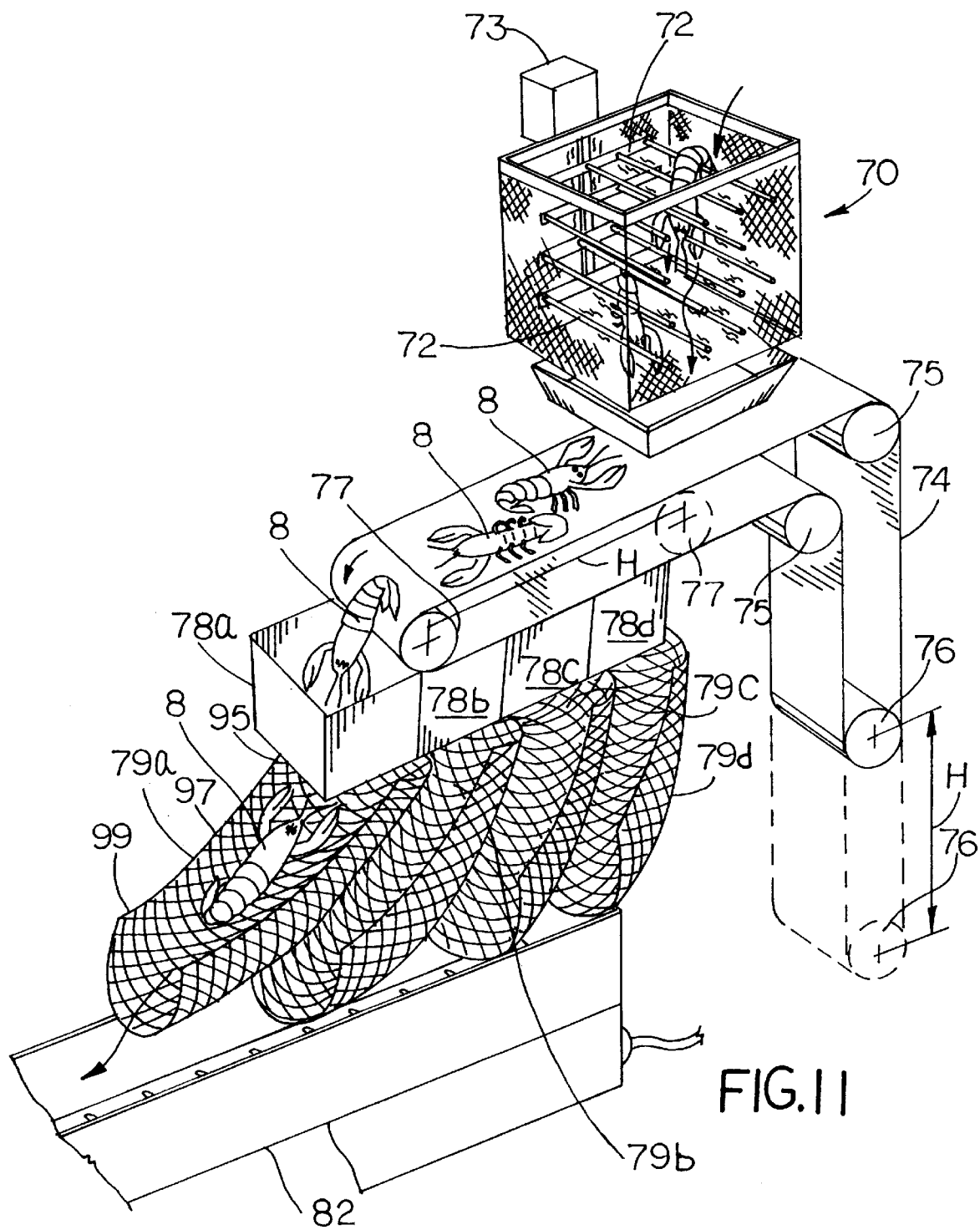
FIG. 11 is a fragmentary view in perspective of the automatic crawfish loading unit of the present invention.

Lower processing assembly 18 includes main processing plate 30 mounted to subframe 32. Processing plate 30 includes tail-straightening element 34, which is preferably a continuous run nylon brush or other suitable material which has sufficient surface friction to engage the tail 7 of crawfish 8 as the crawfish is dragged across element 34 by the horizontal motion of head clamp 24, thereby straightening the tail 7. Processing plate 30 includes separation and extraction area 36. Extraction area 36 includes a pair of extraction holes 37, 38. Gap 39 between processing plate 30 and spent shell chute 35 provides clearance for the horizontal motion of lower processing assembly 18 and also provides space for head clamp assembly 24 to lower to its second intermediate position F as shown in FIG. 5a. Second intermediate position F is necessary in order to clamp tail portion 7 firmly to processing plate 30, because the head or body of crawfish 8 is typically thicker than the forward portion of tail 7, and hence the head or body must be held lower than the tail in order for the tail to be clamped firmly as is discussed below. Lower processing assembly 18 further includes tail clamp assembly 40, which is mounted to linear actuator or thruster 42. Linear thruster 42 is preferably vertically oriented and further includes rotary unit 43 to permit tail clamp assembly 42 to rotate about a vertical axis, so that clamp assembly 42 can swing from a retracted position G as shown in FIGS. 2, 3 and 4 to an extended position H as shown in FIGS. 5, 6 and 7 over the tail 7 of crustacean 8 that has been positioned on processing plate 30 by head clamp assembly 24 as discussed above. Linear thruster 42 then actuates to lower clamp assembly 40 onto the tail 7 of crawfish 8, thus clamping the tail 7 firmly against processing plate 30. Tail clamp assembly 40 further includes a pair of clamping arms 44, 45, which are connected by a bendable strap or flexible clamping diaphragm 46. Tail clamp assembly 40 further includes spring loaded pressure pad or tail brace 47 for bracing the end portion of tail 7, thus clamping the terminal end of the intestinal tract, commonly known as the "mud vein."

Lower processing assembly 18 further includes a pair of air extraction needles 48, 49, mounted below subframe 32 of lower processing assembly 18. Air extraction needles 48, 49 are preferably mounted at an angle and each are mounted to a two-position linear thruster 50, enabling air extraction needles to be shiftable between a retracted position and extended position wherein the tips of air extraction needles 48, 49 penetrate extraction holes 37, 38 in processing plate 30, and protrude into the tail 7 of the crustacean 8, straddling the mud vein. Extraction needles 48, 49 are mounted to mounting plate 53, which in turn is mounted to subframe 54 and frame 11. Extraction needles are connected to a high pressure air source 57, which supplies a burst of air through needles 48, 49 when needles 48, 49 are inserted into the tail 7 of crustacean 8, which extracts the tailmeat and shoots the extracted meat into collection chute 55 for direction to collection conveyor (not shown). The tailmeat is processed and packaged in a conventional manner, although the "head fat" may be recovered and packaged along with the meat as is discussed below.

A shown in FIG. 1, subframe 32 of lower processing assembly 18 is movably mounted to frame 11, and two position linear thruster 51 is attached at one end to frame 11 and at the other end to subframe 32. Alternatively, a fixed stroke air cylinder may be used in place of linear thruster 51. Accordingly, linear thruster 51 is able to move subframe 32 of lower processing assembly 18 back and forth in a direction generally parallel to the infeed direction 13 of crawfish 8. When subframe 32 is moved, processing plate 30 also moves as can be seen in FIG. 5a. As subframe 32 and processing plate 30 move, the crawfish 8 which is clamped to processing plate 30 by tail clamp 40 moves horizontally relative to head clamp 24, which is holding the forward portion or head 6 of the crawfish 8 and which remains stationary. Thruster 51 is preferably set for a quick, short action thrust, and includes stiff return spring 52 to almost instantaneously return lower processing assembly 18 to its original position. The resulting impact and release action ruptures an internal membrane (not shown) that binds the tailmeat of the crustacean 8 to the internal surface of the shell or tail 7.

Referring now to FIGS. 1 and 11 through 15, automatic loading system 14 includes hopper 70 having a plurality of vibrating cascade bars 72, which are repeatedly shaken by vibrator 73, so that crawfish 8 drop through hopper 70 onto continuously reciprocating conveyor 74. Conveyor 74 includes fixed rollers 75 and reciprocating rollers 76, 77. Collection chutes 78a, 78b, 78c and 78d are mounted immediately below conveyor 74, and each collection chute feeds into vibrating orientation slide 79a, 79b, 79c and 79d, respectively. Preferably, four chutes and four slides are used in order to achieve proper spacing on conveyor 74, although a single chute and a single slide may be used. Orientation slides 79a–d are mounted at an angle so that crawfish 8 will slide down the slides and onto conveyor 74, assisted by the vibrating action of vibrator 81. As shown in FIGS. 12 through 15, orientation slides 79a through 79d include substantially flat infeed end 95, outfeed end 97 having trough 97a, and curved middle portion 99 having indentation 99a. Orientation slides 79a through 79d are preferably lined with artificial grass pad or lining 98. Alternatively, the chutes 79a–d may be constructed of or lined with a mesh hardware cloth or a similar roughened material. The claws and legs of crawfish 8 tend to catch or drag on the lining 98 as the crawfish slides down the slide, so that a crawfish entering the slide tail first will remain tail first, while a crawfish entering the slide head first will gradually turn around as it slides down the vibrating slide. Also, due to the natural curve of the crawfish in the cooked state, each crawfish will be on its side when it is dropped at substantially flat infeed end 95. The tail 7 of crawfish 8 gradually drops into indentation 99a, and then into trough 97a as the crawfish moves down vibrating slides 79a–d. Accordingly, each crawfish will exit the orientation slides tail first, dorsal side up. As reciprocating roller 77 moves horizontally a distance H, reciprocating roller 76 moves up and down the same distance, so that conveyor 74 sequentially drops a crawfish 8 into chutes 78a–d, thus sequentially dropping a crawfish 8 onto each orientation slide 79a–d.

A shown in FIG. 1, automatic infeed conveyor 80 includes first stage 82 and second stage 84. Each stage 82, 84 includes a pressurized plenum 85, floor 86 having perforations 87, and sidewalls 88. A pair of side jets 89, 90 provide a continuous jet of air, and are mounted to sidewalls 88 at intervals. The oriented crawfish 8 thus float on a bed of air provided through perforations 87, and side jets 89, 90 urge the crawfish along the conveyor 80 towards pick up point 92. Side jets 89, 90 preferably have vertically oriented rectangular orifices 91, so that the air exiting orifices 91 push crawfish 8 forward and also maintain crawfish 8 in the center of conveyor 80, and in a vertical, non-leaning position. The velocity of the crawfish can be controlled by adjusting both the pressure and the angle of side jets 89, 90. Preferably, the forward velocity of crawfish 8 in infeed direction 13 is slightly higher on first stage 82 than on second stage 84. This ensures a constant supply of crawfish at the pick up point, because the crawfish back up but don't override each other. At pick up point 92, sidewalls 88 include apertures 93 to provide clearance for head clamp assembly 24. Infrared sensor 94 is mounted to second stage 84 of conveyor 80 adjacent pick up point 92. Finally, electronic controller 96 monitors the operations of the machine, and may be adjusted to increase or decrease the cycle time as desired.

In operation, a number of commercially sized crawfish 8 are loaded into hopper 70 and separated by the action of vibrating cascade bars 72. The crawfish 8 drop onto reciprocating conveyor 74, and then are distributed sequentially into collection chutes 78a through 78d, which in turn drop the crawfish onto orientation slides 79a–d. Due to the folded tail, the crawfish at this point will naturally be on their sides, either head first or tail first. Once the crawfish come into contact with vibrating slides 79a–d, the legs and claws repeatedly catch on the rough artificial grass lining 98, while the smoother tail does not, which ensures that the crawfish exit slides 79a–d in a tail first, dorsal side up orientation. The crawfish then move along conveyor 80 on a bed of air towards pick up point 92. Side jets 89, 90 maintain crawfish 8 in the center of air conveyor 80. The presence of crawfish 8 at pick up point 92 is detected by infrared sensor 94, which triggers the commencement of the processing cycle. Alternatively, the crawfish 8 may be manually loaded onto conveyor 74 or manually placed at pick up point 92.

Upon commencement of the processing cycle, carriage 20 is in position A, placing upper processing assembly 16 and head clamp head clamp assembly 24 over pick up point 92. Thruster 21 extends clamp assembly 24 from the fully retracted position C to the fully extended position D immediately over the waiting crawfish 8. Vacuum cup 28 contacts crawfish 8 and lifts it slightly, and controller 96 actuates gripper 25, thus closing arms 26, 27 firmly around the crawfish. Thereafter, thruster 21 raises clamp assembly 24 approximately 1½ inches to the first intermediate position E. In the process, the claws 5 of crawfish 8, which are no longer needed, are ripped off by serrated blades 33. After clamp 24 is raised, carriage 20 begins its horizontal stroke from position A towards position B. In the process, the tail portion is dragged across the tail straightening brush 34, so that by the time the crawfish is in position on main processing area 31 of processing plate 30, the tail is straight. When carriage 20 reaches the end of its horizontal stroke at position B, thruster 21 lowers clamp assembly 24, which positions the tail flat on the processing plate 30.

At this point, rotary unit 43 activates to swing tail clamp assembly 40 approximately ninety degrees into position directly over tail 7, and thruster 42 extends forcing clamp 40 downward, pressing tail 7 firmly against processing plate 30 with flexible diaphragm 46 draped across tail 7 and brace 47 securing the end of the mud vein. Thereafter, linear thruster 51 imparts a brief horizontal force, moving the entire lower processing assembly horizontally approximately ¼ inch, thus rupturing the internal membrane that bonds the tailmeat to the internal surface of the tail 7. Return spring 52 almost immediately returns lower processing assembly to its original position. Thereafter, thruster 21 retracts to position C, which raises head clamp assembly approximately 2⅜ inches, while tail clamp 40 remains stationary. In the process, the head 6 is separated from the tail 7 in a tearing fashion made possible by a bendable strap or flexible diaphragm 46, which allows the forward portion of the tail portion to raise vertically and flex slightly as head clamp 24 raises and separates head 6 from tail 7.

Next, upper processing assembly 16 extracts the head fat, while lower processing assembly 18 simultaneously extracts the tailmeat. After thruster 21 raises clamp assembly 24 to fully retracted position C, carriage 20 begins its horizontal return stroke from position B back to position A. Rotary unit 60 swings approximately ninety degrees forcing vacuum extraction cup 56 into head 6 enabling cup 56 to extract head fat. Preferably, the head fact extraction occurs while carriage 20 is traveling horizontally between positions B and A. Before carriage 20 returns to position A, rotary unit 60 swings vacuum cup back out of head 6, gripper 25 opens arms 26, 27, and air jet 58 shoots a blast of air, which pushes spent head 6 off to the side where it drops onto a waste conveyor (not shown) for disposal.

At the same time, tail 7 is still clamped firmly to processing plate 30 after the head has been separated as discussed above. Linear thruster 50 forces the tips of extraction needles 48, 49 through extraction holes 37, 38 and into tail 7 so that needles 48, 49 penetrate into the tail 7 straddling the mud vein. At this point a charge of air through needles 48, 49 forces the tailmeat inside tail 7 to be discharged with sufficient force that the tailmeat is ejected into collection chute 55 for collection and packaging. Alternatively, a charge of $CO_2$ gas or other gases or fluids may be used. Brace 47 of clamp assembly 40 retains the mud vein within the spent shell. Thereafter, linear thruster 42 retracts, which raises tail clamp assembly 42 off the spent tail shell, and rotary unit 43 rotates tail clamp 40 approximately ninety degrees back to it's original position. The spent tail shell remains on processing plate 30 until the spent shell is pushed out of the way and into chute 35 by the next incoming crawfish 8.

FIGS. 8A and 8B illustrate a second embodiment for the head fat extraction mechanism of the claimed invention, in which the elements are the same or substantially the same as those in the embodiment discussed above and retain the same reference characters, but increased by 100. Clamp assembly 124 includes a pair of gripper arms 126, 127, which are preferably molded or otherwise formed from a stiff rubber material so that clamp assembly 124 can accommodate a variety of crawfish sizes. Gripper arms 126, 127 each include curved surface or indentation 126a, 127a, respectively in order to ensure a firm grip. Gripper arms 126, 127 are mounted to pneumatic gripper 125, and a rotary unit 103 and a linear thruster 104 are mounted to gripper 125. Gripper arms 126, 127 can be shifted horizontally between open position and a closed position clamped around the crawfish upon actuation of gripper 125. Pneumatic gripper 125 is preferably a pneumatically operated Parallel Gripper sold under the brand name PHD by PHD, Inc., of Airport and Piper Drive, Fort Wayne, Ind. Clamp assembly 124 further includes swing arm 155 having head fat extraction tube 156 mounted at one end. Swing arm 155 is mounted to rotary unit 103 which enables swing arm 155 to shift between a raised or retracted position shown in FIG. 8A and a lowered or extended position shown in FIG. 8B. In the lowered position, head fat extraction tube 156 is positioned adjacent the head 6 of crawfish 8. Swing arm 155 is also mounted to linear thruster 104, which permits swing arm 155 to shift between a first position spaced apart from gripper 125 as shown in FIG. 8A, and a second position nearer gripper 125 as shown in FIG. 8B, thus thrusting extraction tube 156 into the separated head 106 of crawfish 108. Head clamp assembly 124 further includes head ejection air jet 158.

It will be appreciated that the foregoing is presented by way of illustration only, and not by way of any limitation, and that various alternatives and modifications may be made to the illustrated embodiment without departing from the spirit and scope of the invention.

What is claimed:

1. An apparatus for removing meat from a crayfish having a head portion and a tail portion, comprising:

a frame;

a pair of clamps movably mounted to said frame, said clamps including means for operating said clamps for causing one of said clamps to grip the head portion of the crayfish and the other clamp to grip the tail portion of the crayfish;

a first actuator cooperating with said pair of clamps for moving one of said pair of clamps toward the other clamp thereby disrupting the bond between the tailmeat and the shell and facilitating the removal of the tailmeat from the shell;

a second actuator for moving either of said pair of clamps away from the other clamp thereby separating the head portion of the crayfish from the tail portion while retaining the tailmeat in the shell of the tail portion; and extraction means for extracting the tailmeat from the tail portion.

2. The apparatus of claim 1, wherein said first actuator includes a pneumatic cylinder.

3. The apparatus of claim 1, wherein said first actuator includes biasing means for returning said impact means to its original position.

4. The apparatus of claim 1, wherein said biasing means is a spring.

5. The apparatus of claim 1, wherein said one clamp includes a pair of gripper arms for grasping the crustacean, said one clamp further including a pneumatic cylinder for shifting said pair of gripper arms between an open position in which said one clamp is disengaged from the crustacean and a closed position in which said one clamp engages the crustacean.

6. The apparatus of claim 5, wherein each of said pair of gripper arms includes a curved indentation, said indentation substantially conforming to the outer dimensions of the crustacean.

7. The apparatus of claim 5, wherein said one clamp further includes a vacuum cup connected to a vacuum source for applying suction to a portion of the crustacean for securing the crustacean within said one clamp.

8. The apparatus of claim 7, wherein said vacuum cup includes a vacuum operated counter for counting each crustacean picked up by said head clamp.

9. The apparatus of claim 1, including removal means cooperating with said one clamp for removing the claws of the crustacean.

10. The apparatus of claim 9, wherein said removal means includes a pair of stationary serrated blades, so that the claws of the crustacean are chopped off as said one clamp moves the crustacean past said pair of blades.

11. The apparatus of claim 1, including a processing plate attached to said frame, and wherein said other clamp further includes a brace for bracing the terminal end of the intestinal tract of the crayfish against said processing plate, said brace including a resiliant pad and further including biasing means for downwardly biasing said pad against the terminal end of the intestinal tract, so that upon extraction of the tailmeat from the tail portion the intestinal tract is retained in the tail portion.

12. The apparatus of claim 11, wherein said processing plate includes a pair of apertures and said extraction means includes a pair of hollow needles for insertion through said apertures and into the tail portion of the crustacean so that said needles straddle said intestinal tract, and compressed air delivery means for forcing compressed air through said hollow needles and into the tail portion to force the tailmeat out of the shell.

13. The apparatus of claim 12, wherein said needles are mounted on a two position pneumatic cylinder.

14. The apparatus of claim 1, including suction means mounted to said one clamp and connected to a vacuum supply source for sucking the head fat from the head portion of the crustacean after the head portion has been removed from the tail portion, collection means for collecting the head fat for packaging, and a conduit connecting said suction means to said collection means.

15. The apparatus of claim 1, wherein said other clamp includes a pneumatically operated rotary unit for rotating said other clamp between a retracted position and an extended position over the tail portion of the crustacean.

16. The apparatus of claim 13, wherein said other clamp further includes a pneumatic cylinder for moving said other clamp between a raised position and a lowered position.

17. A method for extracting edible material from a crustacean, comprising the steps of:
a) grasping a first portion of the crustacean;
b) grasping a second portion of the crustacean;
c) momentarily moving the first portion and the second portion relative to each other;
d) separating the forward portion and the tail portion from each other so that the edible material is retained in each portion; and.

18. The method of claim 17, wherein extracting the edible material includes the additional steps of:
h) sucking the head fat from the head portion of the crustacean after the head portion has been separated from the tail portion; and
i) preserving the head fat for packaging.

19. An apparatus for removing tailmeat from a crustacean, comprising:
a frame;
a pair of clamps movably mounted to said frame, said clamps including means for operating said clamps for causing said clamps to engage portions of the crustacean;
impact means cooperating with said pair of clamps for momentarily moving said pair of clamps relative to each other thereby disrupting the bond between the tailmeat and the shell and facilitating the removal of the tailmeat from the shell; and
extraction means for extracting the tailmeat from the tail portion;
said other of said pair of clamps including bending means for allowing the tail portion of the crustacean to bend slightly, and actuation means for moving one of said clamps away from the other clamp to thereby separate the forward portion of the crustacean from the tail portion of the crustacean.

20. The apparatus of claim 19, wherein said bending means includes a resilient flexible diaphragm.

21. An apparatus for removing tailmeat from a crustacean, comprising:
a frame;
a pair of clamps movably mounted to said frame, said clamps including means for operating said clamps for causing said clamps to engage portions of the crustacean;
impact means cooperating with said pair of clamps for momentarily moving said pair of clamps relative to each other thereby disrupting the bond between the tailmeat and the shell and facilitating the removal of the tailmeat from the shell; and
extraction means for extracting the tailmeat from the tail portion;
and tail straightening means mounted to said frame for straightening the tail of the crustacean, said tail straightening means cooperating with said one clamp.

22. The apparatus of claim 21, wherein said tail straightening means includes a textured surface.

23. An apparatus for removing tailmeat from a crustacean, comprising:
a frame;
a pair of clamps movably mounted to said frame, said clamps including means for operating said clamps for causing said clamps to engage portions of the crustacean;
impact means cooperating with said pair of clamps for momentarily moving said pair of clamps relative to each other thereby disrupting the bond between the tailmeat and the shell and facilitating the removal of the tailmeat from the shell; and
extraction means for extracting the tailmeat from the tail portion;
said one clamp including a carriage movably mounted to said frame, said carriage including a counterweight movably mounted to said frame and connected to said carriage by a belt, said belt being routed over a plurality of pulleys, said carriage for balancing the inertial forces created when said head clamp movement means starts and stops said carriage by moving in a direction opposite the direction of travel of said carriage.

24. A method for extracting edible material from a crustacean, comprising the steps of:

a) grasping a first portion of the crustacean;

b) grasping a second portion of the crustacean;

c) momentarily moving the first portion and the second portion relative to each other;

d) separating the forward portion and the tail portion from each other so that the edible material is retained in each portion;

e) extracting the edible material from each tail portion;

f) clamping the intestinal tract of the crustacean; and g) inserting a pair of hollow needles into the tail portion straddling the intestinal tract after the head portion and the tail portion have been separated, and injecting air into the tail portion thereby ejecting the tailmeat.

25. The method as claimed in claim 24, including the additional step of extracting the head fat from the forward portion after the forward portion and the tail portion have been separated.

26. The method as claimed in claim 24, wherein grasping a first portion of the crustacean includes the additional step of:

g) straightening the tail of the crustacean by dragging the crustacean across a textured surface.

* * * * *